United States Patent
Moroz

(10) Patent No.: US 7,175,389 B2
(45) Date of Patent: Feb. 13, 2007

(54) METHODS AND APPARATUS FOR REDUCING PEAK WIND TURBINE LOADS

(75) Inventor: Emilian Mieczyslaw Moroz, San Diego, CA (US)

(73) Assignee: General Electric Company, Schenectady, NY (US)

( * ) Notice: Subject to any disclaimer, the term of this patent is extended or adjusted under 35 U.S.C. 154(b) by 399 days.

(21) Appl. No.: 10/880,731

(22) Filed: Jun. 30, 2004

(65) Prior Publication Data
US 2006/0002791 A1   Jan. 5, 2006

(51) Int. Cl.
*F03D 7/04* (2006.01)

(52) U.S. Cl. .............................. 416/1; 416/31; 416/32; 416/35; 416/36; 416/37; 416/41; 290/55

(58) Field of Classification Search ............... 416/1, 416/26, 31, 32, 35, 36, 37, 41, 44, 48, 61, 416/169 R; 290/44, 55
See application file for complete search history.

(56) References Cited

U.S. PATENT DOCUMENTS

| | | | |
|---|---|---|---|
| 4,565,929 A * | 1/1986 | Baskin et al. .................. | 416/32 |
| 5,083,039 A | 1/1992 | Richardson et al. | |
| 5,289,041 A | 2/1994 | Holley | |
| 5,907,192 A | 5/1999 | Lyons et al. | |
| 5,990,568 A * | 11/1999 | Hildingsson et al. ......... | 290/55 |
| 6,600,240 B2 | 7/2003 | Mikhail et al. | |
| 7,075,192 B2 * | 7/2006 | Bywaters et al. ............. | 290/55 |

FOREIGN PATENT DOCUMENTS

| | | | |
|---|---|---|---|
| JP | 60-45787 A | * | 3/1985 |
| JP | 3-47479 A | * | 2/1991 |

* cited by examiner

*Primary Examiner*—Christopher Verdier
(74) *Attorney, Agent, or Firm*—James E. McGinness, Esq.; Armstrong Teasdale LLP

(57) ABSTRACT

A method for reducing peak loads of wind turbines in a changing wind environment includes measuring or estimating an instantaneous wind speed and direction at the wind turbine and determining a yaw error of the wind turbine relative to the measured instantaneous wind direction. The method further includes comparing the yaw error to a yaw error trigger that has different values at different wind speeds and shutting down the wind turbine when the yaw error exceeds the yaw error trigger corresponding to the measured or estimated instantaneous wind speed.

32 Claims, 3 Drawing Sheets

METHODS AND APPARATUS FOR REDUCING PEAK WIND TURBINE LOADS

STATEMENT REGARDING FEDERALLY SPONSORED RESEARCH & DEVELOPMENT

The U.S. Government has certain rights in this invention as provided for by the terms of Contract No. DE-AC36-83CH10093, Subcontract No. ZAM-7-13320-26 awarded by the Department of Energy/Midwest Research Institute, National Renewable Energy Laboratory Division.

BACKGROUND OF THE INVENTION

This invention relates generally to wind turbines, and more particularly to methods and apparatus for reducing peak loads of wind turbines such as those that occur in a changing wind environment.

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox. The gearbox steps up the inherently low rotational speed of the turbine rotor for the generator to efficiently convert mechanical energy to electrical energy, which is fed into a utility grid.

Wind turbines are designed to shut down under high yaw error conditions. However, known wind turbines utilize a single "allowable" yaw error set point to initiate high yaw error shutdowns to limit loads. For example, a yaw error trigger may trigger a shutdown procedure when the rotor is angled at more than 45 degrees from the direction of the wind for more than three seconds. This single allowable yaw error may not be an optimum condition to initiate a shutdown for all wind speed conditions. Thus, the wind turbine may experience higher than desired loads under some conditions.

BRIEF DESCRIPTION OF THE INVENTION

Some configurations of the present invention therefore provide a method for reducing peak loads of wind turbines in a changing wind environment. This method includes measuring or estimating an instantaneous wind speed and direction at the wind turbine and determining a yaw error of the wind turbine relative to the measured instantaneous wind direction. The method further includes comparing the yaw error to a yaw error trigger that has different values at different wind speeds and shutting down the wind turbine when the yaw error exceeds the yaw error trigger corresponding to the measured or estimated instantaneous wind speed.

In yet another aspect, the present invention provides a wind turbine that includes a rotor having one or more rotor blades. The wind turbine is configured to measure or estimate an instantaneous wind speed and direction at the wind turbine and determine a yaw error of the wind turbine relative to the instantaneous measured wind direction. The wind turbine is further configured to compare the determined yaw error to a yaw error trigger that has different values at different wind speeds and shut down when the yaw error exceeds the yaw error trigger corresponding to the measured or estimated instantaneous wind speed.

In yet another aspect, the present invention provides a method for reducing peak loads of wind turbines in a changing wind environment. This method includes measuring or estimating an instantaneous wind direction at the wind turbine and a pitch angle and determining a yaw error of the wind turbine relative to the measured instantaneous wind direction. The method further includes comparing the yaw error to a yaw error trigger that has different values at different pitch angles and shutting down the wind turbine when the yaw error exceeds the yaw error trigger corresponding to the measured or estimated pitch angle.

In still another aspect, the present invention provides a wind turbine having a rotor having one or more rotor blades. The wind turbine is configured to measure or estimate an instantaneous wind direction at the wind turbine and a pitch angle and determine a yaw error of the wind turbine relative to the measured instantaneous wind direction. The wind turbine is further configured to compare the yaw error to a yaw error trigger that has different values at different pitch angles and shut down the wind turbine when the yaw error exceeds the yaw error trigger corresponding to the measured or estimated pitch angle.

Because wind direction is more variable at lower wind speeds than at higher wind speeds, it will be seen that configurations of the present invention that provide an increased allowable yaw error at low wind speeds advantageously reduce the likelihood of a shutdown resulting from light winds that vary in direction. Generation of power at winds speeds above the rated wind speed is possible in some configurations of the present invention (at least up to a rated cut off wind speed) because a lower allowable yaw error limit under these conditions ensures that, in such configurations, the wind turbine experiences acceptable loading.

DETAILED DESCRIPTION OF THE INVENTION

The present invention is related to the reduction of peak loads of wind turbines such as those that occur in a changing wind environment. Technical effects of the present invention include an increased allowable yaw error at low wind speeds to advantageously reduce the likelihood of a shutdown resulting from light winds that vary in direction. Technical effects of the present invention can also include generation of power at winds speeds above the rated wind speed in some configurations, at least up to a rated cut off wind speed. A lower allowable yaw error limit under these conditions ensures that, in such configurations, the wind turbine experiences acceptable loading.

As used herein, it will be recognized that a measured parameter can often be inferred or estimated from measurements of other parameters. Therefore, an effort has been made to use the terminology "measured or estimated" to mean a parameter directly measured or inferred or estimated from measurements of other parameters. Nevertheless, it is intended that both term "measured" and "estimated" when appearing alone be construed broadly enough in any case to encompass a measured, estimated, or inferred parameter, unless the term is further explicitly limited to a direct measurement or an indirect estimation.

Figure 1:
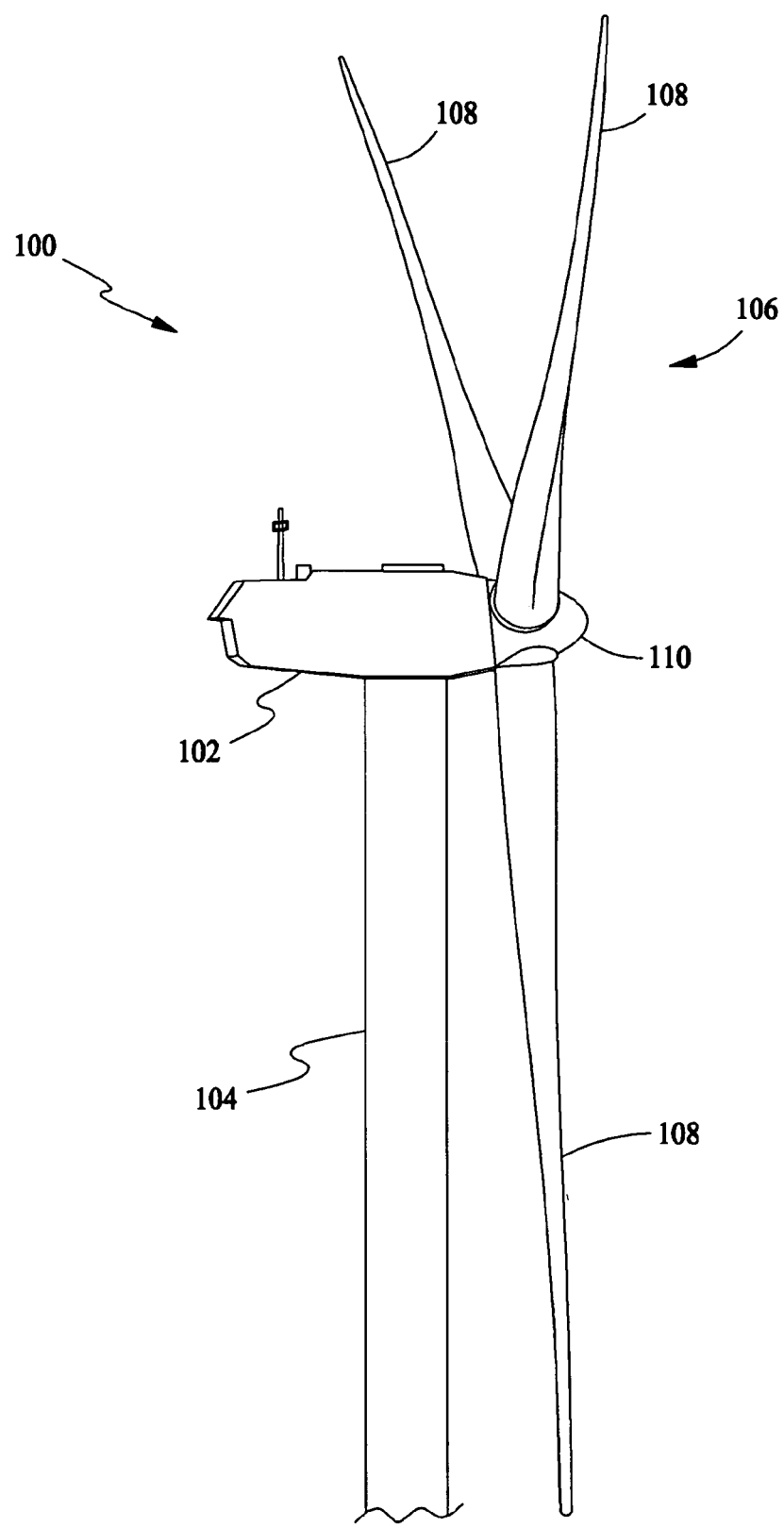
FIG. 1 is a drawing of an exemplary configuration of a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
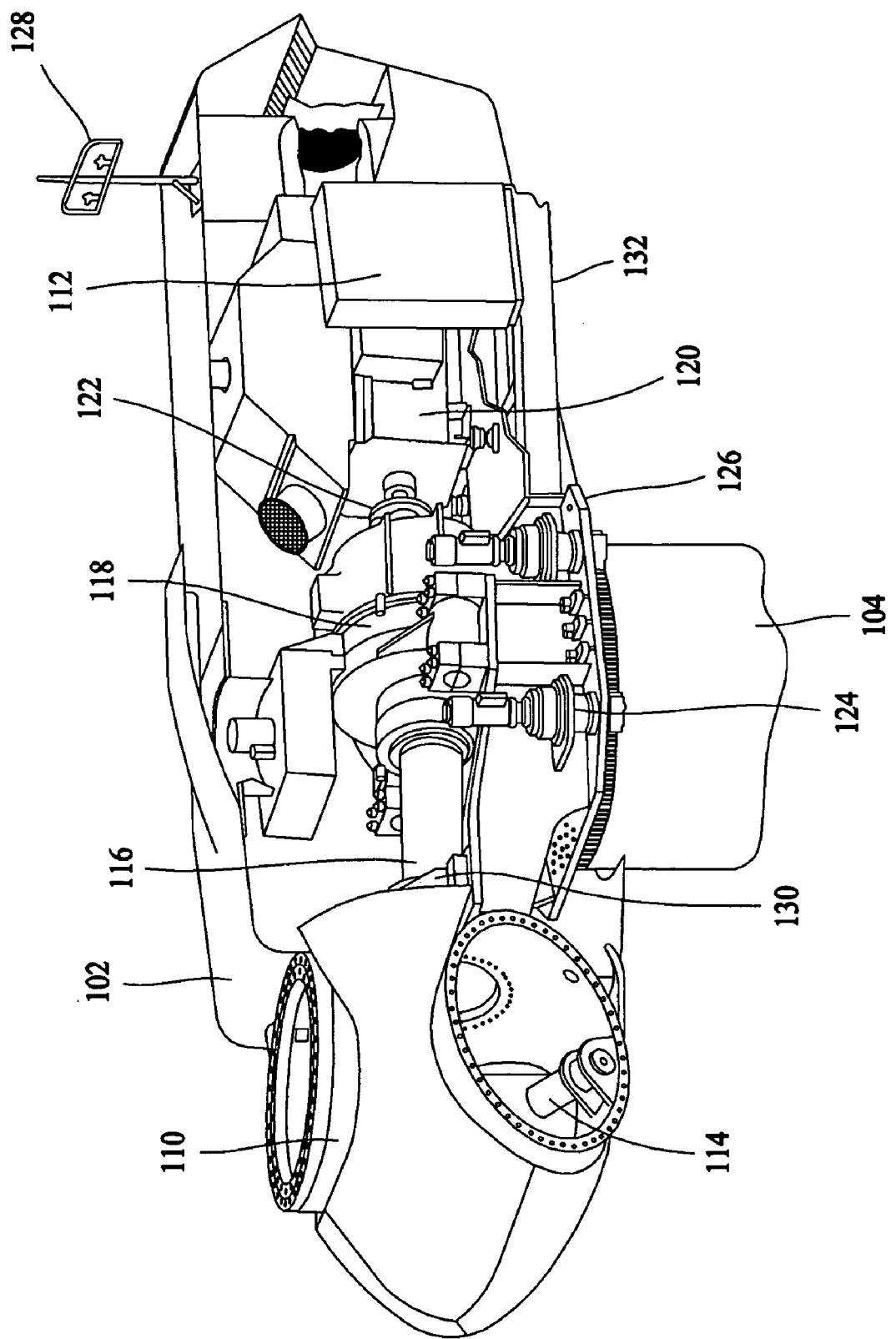
FIG. 2 is a cut-away perspective view of a nacelle of the exemplary wind turbine configuration shown in FIG. 1.

In some configurations and referring to FIG. 2, various components are housed in nacelle 102 atop tower 104 of wind turbine 100. The height of tower 104 is selected based upon factors and conditions known in the art. In some configurations, one or more microcontrollers within control panel 112 comprising a control system are used for overall system monitoring and control including pitch and speed regulation, high-speed shaft and yaw brake application, yaw and pump motor application and fault monitoring. Alternative distributed or centralized control architectures are used in some configurations.

In some configurations, the control system provides control signals to a variable blade pitch drive 114 to control the pitch of blades 108 (not shown in FIG. 2) that drive hub 110 as a result of wind. In some configurations, hub 110 receives three blades 108, but other configurations can utilize any number of blades. In some configurations, the pitches of blades 108 are individually controlled by blade pitch drive 114. Hub 110 and blades 108 together comprise wind turbine rotor 106.

The drive train of the wind turbine includes a main rotor shaft 116 (also referred to as a "low speed shaft") connected to hub 110 via main bearing 130 and, at an opposite end of shaft 116, to a gear box 118. Gear box 118, in some configurations, utilizes a dual path geometry to drive an enclosed high speed shaft. The high speed shaft (not shown in FIG. 2) is used to drive generator 120, which is mounted on main frame 132. In some configurations, rotor torque is transmitted via coupling 122. Generator 120 may be of any suitable type, for example, a wound rotor induction generator.

Yaw drive 124 and yaw deck 126 provide a yaw orientation system for wind turbine 100. Wind vane 128 provides information for the yaw orientation system, including measured instantaneous wind direction and wind speed at the wind turbine. In some configurations, the yaw system is mounted on a flange provided atop tower 104.

Figure 3:
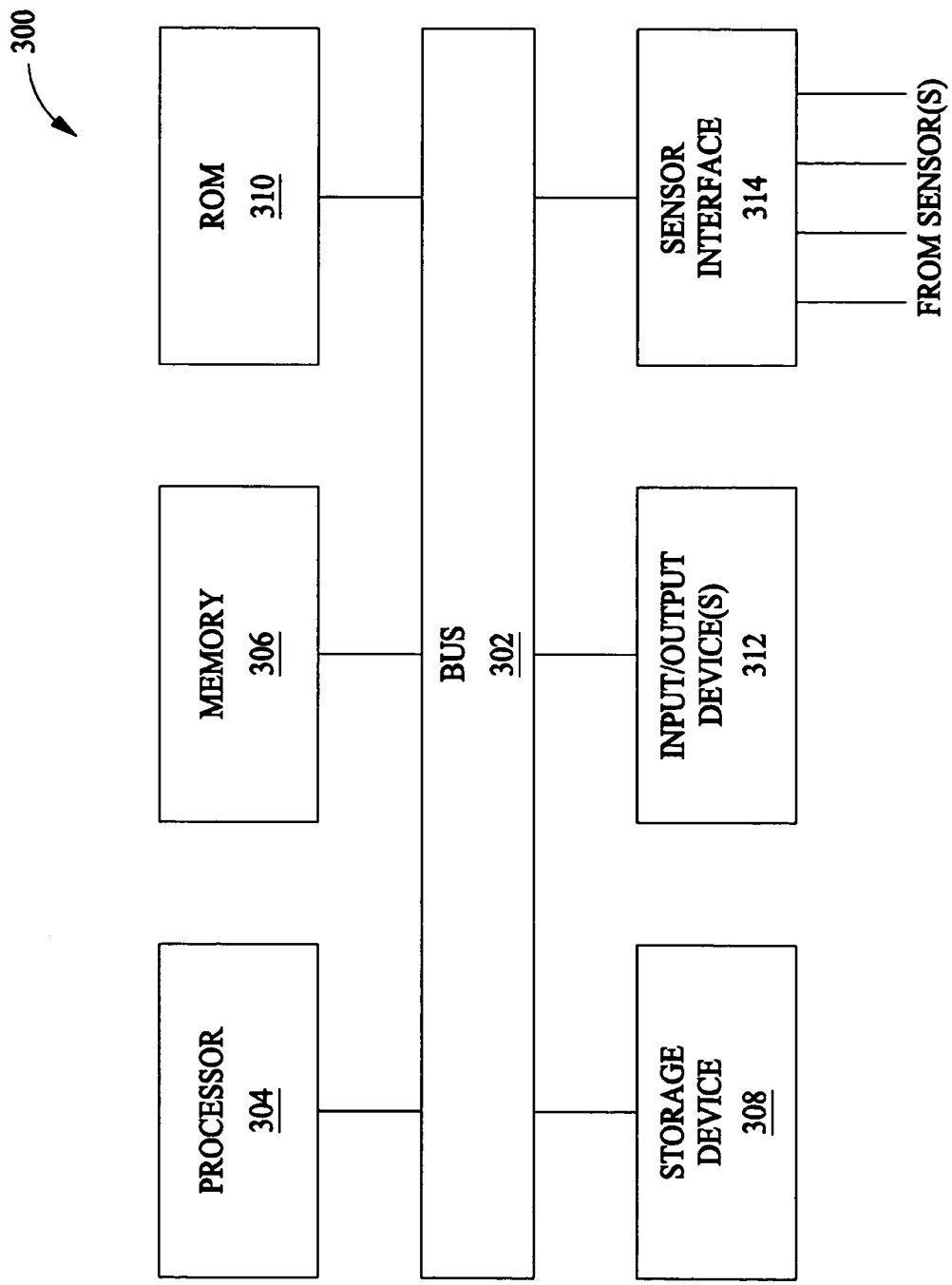
FIG. 3 is a block diagram of an exemplary configuration of a control system for the wind turbine configuration shown in FIG. 1.

In some configurations and referring to FIG. 3, a control system 300 for wind turbine 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304.

In some configurations of the present invention, peak wind loads on wind turbine 100 are reduced in a changing wind environment by first measuring (or otherwise estimating, such as from other measurements) instantaneous wind speed and direction at wind turbine 100. For example, wind vane 128 is used to provide these measurements in some configurations. From shaft encoders or any other suitable means for determining yaw position, a yaw error of wind turbine 100 is determined relative to the measured instantaneous wind direction. An "allowable" yaw error schedule is provided to control system 300 that includes triggering values of yaw error that have different values at different measured or estimated wind speeds. (In some configurations, the yaw error trigger values are dependent upon on pitch angle demand or pitch rates. Because pitch angle demand and pitch rates are dependent upon wind speed, the yaw error triggers in such configurations are also considered herein to be dependent upon wind speed.) For example, in some configurations, rated wind speed (which is effectively determined by the rating of generator 120) is 12 m/sec. The determined yaw error is compared to the yaw error trigger, and wind turbine 100 is shut down when the yaw error exceeds the yaw error trigger corresponding to the measured or estimated instantaneous wind speed.

A yaw error schedule can be a function stored in memory and used by controller 300 to determine an appropriate yaw error trigger for a particular operating condition, or it can be a look-up table of yaw error triggers for a range of operating conditions. These operating conditions can include, for example, pitch angle, wind speed, or both. The allowable yaw error schedule in many configurations of the present invention provides a yaw error trigger greater than the rated wind speed yaw error trigger (which is, for example, 45 degrees in some configurations). This relatively high yaw error trigger is used at wind speeds lower than rated wind speed. At such low wind speeds, blades 108 are not heavily loaded. Some configurations of the present invention also provide a yaw error trigger less than the rated wind speed yaw error trigger. This relatively low yaw error trigger is used at wind speeds higher than the rated wind speed. At such high wind speeds, blades 108 may be more heavily loaded. For example, the yaw error trigger at high wind speeds is set at 30 degrees at the cut off speed of wind turbine 100. (The cut off speed is greater than the rated wind speed.) In various configurations, the yaw error schedule provides either higher yaw error triggers at low wind speeds, lower yaw error triggers at high wind speeds, or both. By way of example, the yaw error trigger can be a decreasing function of wind speed or a step function. In some configurations, the yaw error trigger is at least one of a step function or a linear function of wind speed. The yaw error trigger is used in a braking procedure. For example, if the yaw error is exceeded for more than a predetermined period of time (e.g., three seconds), a shutdown procedure is applied. One shutdown procedure includes yawing the rotor to an approximately 90 degree yaw position with respect to wind direction to minimize loading. An example of another shutdown procedure is to pitch rotor blades 108 to a 90 degree position with respect to wind direction. (U.S. Pat. No. 6,600,240, issued Jul. 29, 2003 to Mikhail et al. describes a shutdown procedure in which blades are pitched 90 degrees in a different context.) In either procedure, when rotor 106 has decelerated and is turning at a sufficiently slow rate (e.g., one revolution per minute in some configurations), brakes are applied to stop rotor 106 from turning. In many configurations, a shutdown strategy is used that does not itself increase system loading that would arise from yaw error triggering the shutdown. Other load mitigation procedures, including wind speed optimized braking strategies, determined either empirically or through analysis, can be used. In one embodiment the yaw error trigger is also a function of one or more of pitch angle, wind speed, rotor diameter, and wind turbulence at one or more selected wind turbine sites.

As discussed above, some configurations utilize pitch angle demand and/or pitch rates (herein referred to generically as "pitch angle") instead of measured wind speeds. In such configurations, instantaneous wind speeds need not be measured. The pitch angle or angles are used as the variable or variables in the yaw error schedule. However, yaw error triggers in the yaw error schedule still vary at different wind speeds. Thus, a yaw error schedule in a configuration in which wind speed is measured and used to determine yaw error triggers can be modified for use in a configuration in which pitch angles are used by an appropriate change in variables. Thus, a yaw error trigger that decreases with increasing wind speed will necessarily be a yaw error trigger that decreases with increasing demanded pitch angle and vice versa. For pitch regulated turbines, pitch angle increases with rising wind speed above rated wind speed in a predictable way, at least on a time averaged basis. A yaw error trigger that is a step function of wind speed will necessarily be a step function of pitch angle demand and vice versa. A change at a rated wind speed will necessarily be a change at a particular pitch angle In some configurations, the yaw error trigger is at least one of a step function or a linear function of pitch angle.

Wind direction is more variable at lower wind speeds than at higher wind speeds. By providing an increased allowable yaw error at low wind speeds, configurations of the present invention reduce the likelihood of a shutdown resulting from light winds that vary in direction. These light winds produce high yaw errors but relatively light loads. Generation of power at winds speeds above the rated wind speed is possible in some configurations of the present invention (at least up to a cut out wind speed). This generation is possible because a lower allowable yaw error limit under these conditions ensures that the wind turbine experiences more acceptable extreme yaw induced loading.

While the invention has been described in terms of various specific embodiments, those skilled in the art will recognize that the invention can be practiced with modification within the spirit and scope of the claims.

What is claimed is:

1. A method for reducing peak loads of wind turbines in a changing wind environment, said method comprising:
   measuring or estimating an instantaneous wind speed and direction at the wind turbine;
   determining a yaw error of the wind turbine relative to the measured or estimated instantaneous wind direction;
   comparing the yaw error to a yaw error trigger that is a varying function of wind speed; and
   shutting down the wind turbine when the yaw error exceeds the yaw error trigger corresponding to the measured or estimated instantaneous wind speed.

2. A method in accordance with claim 1 wherein the yaw error trigger is a decreasing function of wind speed.

3. A method in accordance with claim 1 wherein the yaw error trigger is at least one of a step function or a linear function of wind speed.

4. A method in accordance with claim 3 wherein said step function changes value at a rated wind speed selected in accordance with a rating of a generator of the wind turbine.

5. A method in accordance with claim 4 wherein the yaw error trigger is lower above the rated wind speed than below the rated wind speed.

6. A method in accordance with claim 1 wherein shutting down the wind turbine comprises yawing a rotor of the wind turbine to an approximately 90 degree yaw position with respect to wind direction.

7. A method in accordance with claim 6 wherein shutting down the wind turbine further comprises waiting for the rotor to slow before applying brakes to stop the rotor from turning.

8. A method in accordance with claim 1 wherein shutting down the wind turbine further comprises waiting for a rotor to slow before applying brakes to stop the rotor from turning.

9. A method in accordance with claim 1 wherein shutting down the wind turbine comprises pitching blades of a wind turbine to an approximately 90 degree pitch position with respect to the wind direction.

10. A method in accordance with claim 9 wherein shutting down the wind turbine further comprises waiting for the rotor to slow before applying brakes to stop the rotor from turning.

11. A method in accordance with claim 1 wherein the yaw error trigger is also a function of one or more of pitch angle, rotor diameter, and wind turbulence at one or more selected wind turbine sites.

12. A wind turbine comprising a rotor having one or more rotor blades, said wind turbine configured to:
   measure or estimate an instantaneous wind speed and direction at the wind turbine;
   determine a yaw error of the wind turbine relative to the instantaneous measured or estimated wind direction;
   compare the determined yaw error to a yaw error trigger that is a varying function of wind speed; and
   shut down the wind turbine when the yaw error exceeds the yaw error trigger corresponding to the measured or estimated instantaneous wind speed.

13. A wind turbine in accordance with claim 12 wherein the yaw error trigger is a decreasing function of wind speed.

14. A wind turbine in accordance with claim 12 wherein the yaw error trigger is at least one of a step function or a linear function of wind speed.

15. A wind turbine in accordance with claim 14 wherein said step function changes value at a rated wind speed selected in accordance with a rating of a generator of the wind turbine.

16. A wind turbine in accordance with claim 15 wherein the yaw error trigger is lower above the rated wind speed than below the rated wind speed.

17. A wind turbine in accordance with claim 12 wherein, to shut down, said wind turbine is configured to yaw said rotor to an approximately 90 degree yaw position with respect to wind direction.

18. A wind turbine in accordance with claim 17 wherein, to shut down, said wind turbine is further configured to wait for said rotor to slow before applying brakes to stop the rotor from turning.

19. A wind turbine in accordance with claim 12 wherein, to shut down, said wind turbine is further configured to wait for said rotor to slow before applying brakes to stop the rotor from turning.

20. A wind turbine in accordance with claim 12 wherein, to shut down, said wind turbine is configured to pitch blades of the wind turbine to an approximately 90 degree pitch position with respect to the wind direction.

21. A wind turbine in accordance with claim 20 wherein, to shut down, said wind turbine is further configured to wait for said rotor to slow before applying brakes to stop the rotor from turning.

22. A wind turbine in accordance with claim 12 wherein the yaw error trigger is also a function of one or more of pitch angle, rotor diameter, and wind turbulence at one or more selected wind turbine sites.

23. A method for reducing peak loads of wind turbines in a changing wind environment, said method comprising:
measuring or estimating an instantaneous wind direction at the wind turbine and a pitch angle;
determining a yaw error of the wind turbine relative to the measured or estimated instantaneous wind direction;
comparing the yaw error to a yaw error trigger that is a varying function of pitch angles; and
shutting down the wind turbine when the yaw error exceeds the yaw error trigger corresponding to the measured or estimated pitch angle.

24. A method in accordance with claim 23 wherein the yaw error trigger is a decreasing function of wind speed.

25. A method in accordance with claim 23 wherein the yaw error trigger is at least one of a step function or a linear of wind speed.

26. A method in accordance with claim 25 wherein said step function changes value at a rated wind speed selected in accordance with a rating of a generator of the wind turbine.

27. A method in accordance with claim 23 wherein the yaw error trigger is also a function of one or more of wind speed, rotor diameter, and wind turbulence at one or more selected wind turbine sites.

28. A wind turbine comprising a rotor having one or more rotor blades, said wind turbine configured to:
measure or estimate an instantaneous wind direction at the wind turbine and a pitch angle;
determine a yaw error of the wind turbine relative to the measured or estimated instantaneous wind direction;
compare the yaw error to a yaw error trigger that is a varying function of pitch angle; and
shut down the wind turbine when the yaw error exceeds the yaw error trigger corresponding to the measured or estimated pitch angle.

29. A wind turbine in accordance with claim 28 wherein the yaw error trigger is a decreasing function of pitch angle.

30. A wind turbine in accordance with claim 28 wherein the yaw error trigger is at least one of a step function or a linear function or both of pitch angle.

31. A wind turbine in accordance with claim 30 wherein said step function changes value at a rated wind speed selected in accordance with a rating of a generator of the wind turbine.

32. A wind turbine in accordance with claim 28 wherein the yaw error trigger is also a function of one or more of wind speed, rotor diameter, and wind turbulence at one or more selected wind turbine sites.

* * * * *

UNITED STATES PATENT AND TRADEMARK OFFICE
CERTIFICATE OF CORRECTION

PATENT NO. : 7,175,389 B2
APPLICATION NO. : 10/880731
DATED : February 13, 2007
INVENTOR(S) : Moroz It is certified that error appears in the above-identified patent and that said Letters Patent is hereby corrected as shown below:

In Claim 9, column 6, line 37, delete "blades of a wind" and insert therefor -- blades of the wind --.
In Claim 10, column 6, line 42, delete "stop the rotor" and insert therefor -- stop a rotor --.

Signed and Sealed this

Twenty-seventh Day of November, 2007

JON W. DUDAS
*Director of the United States Patent and Trademark Office*